United States Patent [19]
Karlsson

[11] Patent Number: 5,518,609
[45] Date of Patent: May 21, 1996

[54] DEVICE FOR CLEANING OF CAUSTIC LIQUID MIXTURES

[75] Inventor: Hans Åke Karlsson, Hedemora, Sweden

[73] Assignee: Caustec, Sweden

[21] Appl. No.: 318,792

[22] PCT Filed: Apr. 5, 1992

[86] PCT No.: PCT/SE93/00289

§ 371 Date: Oct. 14, 1994

§ 102(e) Date: Oct. 14, 1994

[87] PCT Pub. No.: WO93/20921

PCT Pub. Date: Oct. 28, 1993

[30] Foreign Application Priority Data

Apr. 14, 1992 [SE] Sweden ................... 9201181

[51] Int. Cl.[6] ................ B01D 29/60; B01D 29/88
[52] U.S. Cl. .............. 210/97; 210/110; 210/323.2
[58] Field of Search .................. 210/86, 97, 104, 210/323.2, 333.01, 193, 346, 110, 322, 416.1

[56] References Cited

U.S. PATENT DOCUMENTS

| 4,163,724 | 8/1979 | Muller et al. | 210/323.2 |
|---|---|---|---|
| 4,243,533 | 1/1981 | Savolainen et al. | 210/323.2 |
| 4,264,445 | 4/1981 | Lumikko et al. | 210/323.2 |
| 4,436,633 | 3/1984 | Robinsky et al. | 210/323.2 |
| 4,439,327 | 3/1984 | Muller | 210/323.2 |
| 4,525,274 | 6/1985 | Willus et al. | 210/323.2 |
| 4,528,103 | 7/1985 | Spilken et al. | 210/323.2 |
| 5,227,076 | 7/1993 | Bogen et al. | 210/323.2 |

FOREIGN PATENT DOCUMENTS

| 072672 | 2/1983 | European Pat. Off. |
|---|---|---|
| 0155336 | 9/1985 | European Pat. Off. |
| 2419744 | 10/1979 | France |
| 612359 | 7/1979 | Switzerland |

Primary Examiner—Joseph W. Drodge
Attorney, Agent, or Firm—Quarles & Brady

[57] ABSTRACT

A device for cleaning caustic liquor mixtures containing lime, comprising a closed chamber 7 for the caustic liquor mixture to be cleaned with an upper horizontal wall 5, to which a number of hollow filter elements 8 are attached. The filter elements extend downwardly in the chamber and communicate with the latter via a great number of filtrate holes 9 in the filter elements. Each filter element is provided with a filter material 10, which covers the filtrate holes. According to the invention, the filtrate holes 9 are arranged below a horizontal plane P, which is situated below and at a distance from the horizontal wall 5 such that during operation gas is enclosed between the wall and the uncleaned caustic liquor mixture. As a result the caustic liquor mixture in the chamber is prevented from contacting the wall 5, which counteracts the formation of permanent tight layers of lime on the filter material.

3 Claims, 1 Drawing Sheet

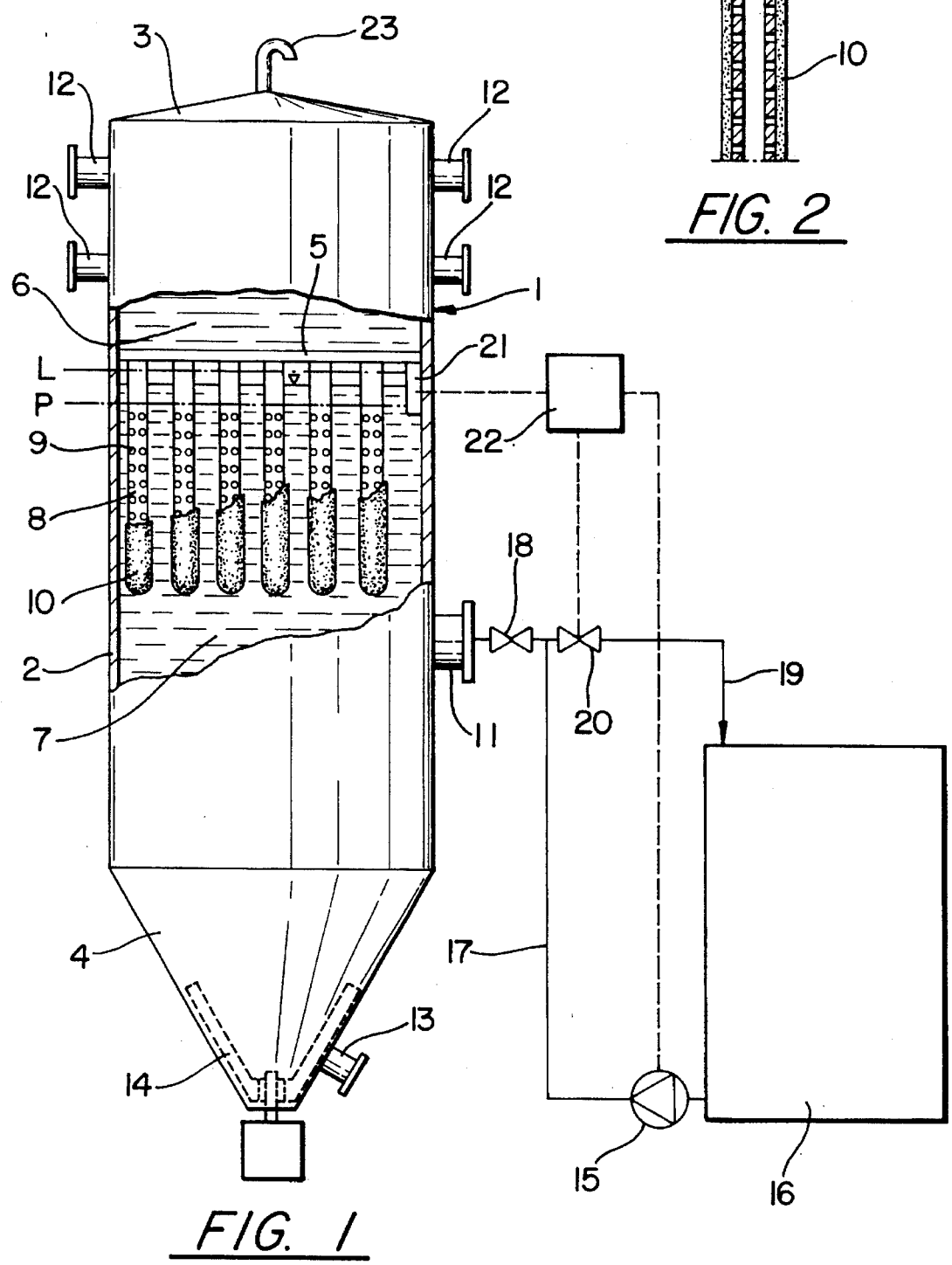

DEVICE FOR CLEANING OF CAUSTIC LIQUID MIXTURES

The present invention relates to a device for cleaning caustic liquor mixtures containing lime, comprising a housing, a substantially horizontal wall, which is arranged in the housing such that a closed chamber is formed in the housing below the horizontal wall, and a number of hollow filter elements, which are attached to the horizontal wall and extend from the latter downwardly in the chamber. The interior of each filter element communicates with the chamber via a great number of filtrate holes in the filter element. Each filter element is provided with a filter material, which covers the filtrate holes. In addition, the device comprises an inlet member for supplying the caustic liquor mixture to be cleaned to the chamber, means for discharging cleaned caustic liquor mixture from the filter elements, and means for providing a pressure difference between the chamber and the interior of the filter elements, such that during operation a clean fraction of the caustic liquor mixture is pressed through the filter material and the filtrate holes into the filter elements.

When producing sulphate pulp from raw material of wood, wood chips are cooked with white liquor containing caustic soda and sodium sulphide. During the cooking there is created black liquor containing dissolved wood substance. The black liquor is treated in a process for producing clean white liquor, which is reused for the cooking of wood chips. Intermediate products of caustic liquor mixtures are obtained during this process, such as uncleaned green liquor containing burnt wood substance, sodium sulphide and soda, uncleaned white liquor containing caustic soda, sodium sulphide and lime (calcium carbonate), and diluted lime mud containing lime and weak caustic liquor (low concentration of caustic soda and sodium sulphide).

The device of the kind described above is usually used for cleaning of said uncleaned white liquor, the white liquor being separated from lime, and for cleaning (washing) of said diluted lime mud, the lime being separated from weak liquor. During the cleaning of white liquor or lime mud, lime is deposited on the filter material, liquid impervious layers of lime being formed relatively rapidly on the filter material. At intervals of a few minutes the filter elements therefore are regularly backflushed with filtrate so that the layers of lime are released from the filter elements and sink towards the bottom of the chamber.

The device may also be used for cleaning of uncleaned green liquor obtained during said process, the green liquor being cleaned from burnt wood substance. However, lime has to be added to the uncleaned green liquor before the latter is supplied to the chamber in order to prevent an immediate clogging of the filter material with green liquor sludge. Thus, also in this case the filter elements have to be backflushed regularly to release the formed liquid impervious layers of lime.

A problem of this device is that liquid impervious permanent layers of lime often are formed on at least parts of the filter elements in spite of the regular backflushing of the filter elements. Such permanent layers of lime deteriorate the capacity of the device. Therefore the device has to be taken out of operation from time to time for manual cleaning of the filter elements.

The object of the present invention is to provide an improved device of the kind discussed above, so that the formation of permanent layers of lime on the filter elements is counteracted, whereby there is no need for taking the device out of operation as often as previously for the manual cleaning of the filter elements.

This object is obtained by means of a device of the kind described initially, which primarily is characterized in that the filtrate holes of the filter elements are arranged below a horizontal plane, which is situated below and at a distance from the horizontal wall such that during operation gas is enclosed between the wall and the caustic liquor mixture in the chamber. In consequence, during operation of the device the caustic liquor mixture in the chamber is prevented from contacting the horizontal wall because of said enclosed gas. As soon as the caustic liquor mixture cannot contact the horizontal wall it has been proved that the problem of formation of permanent layers of lime on the filter elements has been eliminated. Apparently the formation of permanent layers of lime has been initiated by lime contacting with and depositing on the horizontal wall between the filter elements, so that bridges of lime have been formed between the filter elements. Such lime bridges can be strong enough not to be broken by the backflushing.

During operation the chamber is normally subjected to an overpressure of about twice the atmospheric pressure, which leads to that said enclosed gas is compressed to half its original volume. Because of this the distance between the horizontal wall and said plane should be at least 50 mm, whereby the surface of the caustic liquor mixture will be at a distance of about 25 mm from the horizontal wall directly after the chamber has been filled with the caustic liquor mixture and pressurized. Of course, the gas volume will gradually decrease during operation because of the fact that gas is entrained by the caustic liquor mixture out of the device, whereby the surface of the caustic liquor mixture will come closer to the horizontal wall. Therefore, the supply of caustic liquor mixture to the chamber is interrupted suitably one or a few times per day before the caustic liquor mixture will contact the horizontal wall, in order to re-establish the original volume of the enclosed gas.

However, said decrease of the gas volume may take place at different rates at different applications of the device. Therefore, the distance between the horizontal wall and said plane preferably is at least 200 mm, whereby the surface of the caustic liquor mixture will be at a safe distance of about 100 mm from the horizontal wall directly after that the chamber has been filled with caustic liquor mixture and pressurized.

The device is suitably provided with a means for sensing the level of the surface of the caustic liquor mixture between the horizontal wall and said plane. Such a sensing means can be utilized for determining when the supply of caustic liquor mixture to the chamber has to be interrupted, in order to re-establish the original volume of the enclosed gas. For instance, the sensing means may be connected to a control means adapted to interrupt the supply of caustic liquor mixture, when the sensing means senses the surface of the caustic liquor mixture at a predetermined level in the chamber.

The invention is described more closely in the following with reference to the accompanying drawing, in which FIG. 1 shows a partly sectioned view of the device according to the invention, and FIG. 2 shows a section through an enlarged detail of the device according to FIG. 1.

The device shown in the drawing comprises a housing 1 with a cylindrical vertical circumferential wall 2, an upper gable wall 3 and a lower funnel shaped gable wall 4. A horizontal partition wall 5 divides the interior of the housing 1 into an upper chamber 6 and a lower chamber 7. A number of tubular straight filter elements 8 extend through respective holes in the partition wall 5 and are attached to the partition wall 5, so that the holes of the partition wall 5 are sealed. The filter elements 8 extend from the partition wall 5 vertically downwardly in the chamber 7. The interior of each filter element 8 communicates with the chamber 7 via a great number of filtrate holes 9 in each filter element 8. A sock shaped filter material 10 is applied on each filter element 8, so that the filtrate holes 9 are covered with the filter material 10.

The housing 1 is provided with an inlet member 11 for supplying the caustic liquor mixture to be cleaned to the chamber 7, a plurality of outlet members 12 for discharging cleaned caustic liquor mixture from the chamber 6, and an outlet member 13 at the lower gable wall 4 for discharging sludge from the chamber 7. At the apex of the funnel shaped lower gable wall 4 there is a stirring member 14, for preventing sludge from settling on the bottom of the chamber 7.

A pump 15 is adapted to pump the caustic liquor mixture to be cleaned from a container 16 via a conduit 17, a valve 18 and the inlet member 11 into the chamber 7. From the conduit 17 a recirculation conduit 19 extends back to the container 16. The recirculation conduit 19 is provided with a valve 20.

In an area located between a horizontal plane P, which extends through the chamber 7, and the horizontal partition wall 5 the filter elements 8 are lacking filtrate holes 9. The plane P is situated at a distance of 200 mm from the partition wall 5. A sensing member 21 (for instance comprising a floating body) for sensing of liquid levels is adapted to sense the level of the surface of the caustic liquor mixture between the partition wall 5 and the plane P. A control means 22 is connected to the sensing means 21, the valve 20 and the pump 15. The control means 22 is adapted to stop the pump 15 and open the valve 20 in response to the sensing means 21, when the sensing means 21 senses the surface of the caustic liquor mixture at a predetermined level L in the chamber 7. In this case the level L is situated 10 mm from the partition wall 5.

The upper chamber 6, which is adapted to receive cleaned caustic liquor mixture from the filter elements 8, communicates with atmosphere via a ventilating pipe 23 on the gable wall 3. As an alternative the upper chamber 6 may be formed completely closed against atmosphere, in conformity with the lower chamber 7.

The device is operated in the following manner. With the valve 18 open and the valve 20 closed, the caustic liquor to be cleaned is pumped by means of the pump 15 from the container 16, via the conduit 17, the valve 18 and the inlet member 11 into the chamber 7, so that a pressure of about twice the atmospheric pressure will prevail in the chamber 7. A clean fraction of the caustic liquor mixture is pushed through the filter material 10 and via the filtrate holes 9 into the filter elements 8, layers of separated sludge being formed on the filter material 10. From the filter elements 8 the cleaned caustic liquor mixture is pushed via the upper open ends of the filter elements 8 into the upper chamber 6 and further out through the outlet members 12. In the chamber 7 free sludge slowly sinks towards the bottom of the chamber 7 and is discharged therefrom via the outlet member 13. Settling of sludge on the lower gable wall 4 is prevented by the stirring member 14, which continuously stirs the caustic liquor mixture along the bottom of the chamber 7.

At intervals of a few minutes the pump 15 is stopped and the valve is opened for a short while, the pressure in the chamber 7 being decreased, since the caustic liquor mixture in the chamber 7 is able to flow back to the container 16 via the recirculation conduit 19, which means that cleaned caustic liquor mixture under influence of hydrostatic pressure flows back from the upper chamber 6 into the filter elements 8 and flushes the layers of sludge off the filter material. (As an alternative the pressure decrease required for a short while in the chamber 7 may be provided by only opening the valve 20, whereas the pump 15 is allowed to continue to work, since the caustic liquor mixture only circulates from the container 16 via the conduits 17 and 19 back to the container 16, when the valve 20 is open). The layers of sludge flushed off then sink towards the bottom of the chamber 7, are homogenized by the stirring member 14 and are discharged from the chamber 7 via the outlet member 13.

In the upper part of the chamber 7 there is created a gas pocket which is compressed to about half its original volume by the double atmospheric pressure prevailing in the chamber 7. The original volume of the gas pocket is defined by the circumferential wall 2, the partition wall 5 and the plane P. In case gas is lost from the gas pocket during operation, so that the caustic liquor mixture in the chamber 7 approaches the partition wall 5, the sensing means 21 will give a signal to the control means 22, when the surface of the caustic liquor mixture reaches the level L. In this case the control means 22 will stop the pump 15 and open the valve 20 during a period of time which is substantially longer than required merely for rinsing the filter material 10. Hereby the upper chamber 6 is completely emptied of clean caustic liquor mixture, which means that air penetrates into the chamber 7 and restores the gas pocket to its original volume.

I claim:

1. A device for cleaning caustic liquor mixtures containing lime, comprising:

a housing (1);

a substantially horizontal wall (5), said horizontal wall arranged in said housing such that a closed chamber (7) is formed in said housing below said horizontal wall;

a plurality of hollow filter elements (8) attached to said horizontal wall, said plurality of filter elements downwardly extending from said horizontal wall in said chamber, each of said filter elements having an interior, said interior of each filter element communicating with said chamber by a plurality of filtrate holes (9) in said filter elements, and each of said filter elements providing a filter material (10) covering said plurality of filtrate holes;

an inlet member arranged (11) for supplying a supply of uncleaned caustic liquor mixtures to be cleaned to said chamber so that said mixtures accumulate in said chamber up to a surface level;

means (12) for discharging cleaned caustic liquor mixtures from said plurality of hollow filter elements;

means (15) for providing a pressure difference between said chamber and said interiors of said plurality of filter elements so that during operation a clean fraction of caustic liquor mixtures is pressed through each said filter material and said filtrate holes into said plurality of filter elements, wherein said plurality of filtrate holes (9) are arranged below a horizontal plane (P), said plane situated below and at a distance from said horizontal wall (5), such that during operation gas is enclosed between said horizontal wall (5) and said surface level of caustic liquor mixtures in said chamber (7);

means (16) for sensing the level of the surface of caustic liquor mixtures in said chamber (7) between said horizontal wall (5) and said plane (P); and a control means (17) adapted to interrupt the supplying of uncleaned caustic liquor mixtures to said chamber in response to said sensing means sensing the surface of caustic liquor mixtures at a predetermined level (L) in said chamber (7).

2. A device according to claim 1, wherein the distance between the horizontal wall (5) and said plane (P) is at least 50 mm.

3. A device according to claim 2, wherein the distance between the horizontal wall (5) and said plane (P) is at least 200 mm.

* * * * *